(12) United States Patent
Zhu et al.

(10) Patent No.: US 9,210,434 B2
(45) Date of Patent: Dec. 8, 2015

(54) SCREEN MAP AND STANDARDS-BASED PROGRESSIVE CODEC FOR SCREEN CONTENT CODING

(71) Applicant: Microsoft Corporation, Redmond, WA (US)

(72) Inventors: Lihua Zhu, San Jose, CA (US); Sridhar Sankuratri, Campbell, CA (US); Alp Emre Kanlikilicer, San Jose, CA (US); Tong Wynn, Redmond, WA (US); Vladimir Stoyanov, Redmond, WA (US); B. Anil Kumar, Saratoga, CA (US); Nadim Abdo, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 35 days.

(21) Appl. No.: 13/916,511

(22) Filed: Jun. 12, 2013

(65) Prior Publication Data

US 2014/0369421 A1  Dec. 18, 2014

(51) Int. Cl.
*H04N 19/17* (2014.01)
*H04L 29/06* (2006.01)
*G06F 3/14* (2006.01)
*H04N 21/234* (2011.01)
*H04N 21/235* (2011.01)
*H04N 21/266* (2011.01)
*H04N 21/2662* (2011.01)
*H04N 19/176* (2014.01)

(Continued)

(52) U.S. Cl.
CPC .............. *H04N 19/17* (2014.11); *G06F 3/1454* (2013.01); *H04L 65/602* (2013.01); *H04L 65/80* (2013.01); *H04L 69/04* (2013.01); *H04N 19/112* (2014.11); *H04N 19/12* (2014.11); *H04N 19/136* (2014.11); *H04N 19/167* (2014.11); *H04N 19/176* (2014.11); *H04N 19/34* (2014.11); *H04N 19/85* (2014.11); *H04N 21/2353* (2013.01); *H04N 21/23406* (2013.01); *H04N 21/2662* (2013.01); *H04N 21/26603* (2013.01); *G09G 2340/02* (2013.01); *G09G 2350/00* (2013.01); *G09G 2370/022* (2013.01)

(58) Field of Classification Search
USPC ......................................... 382/232, 233, 239
See application file for complete search history.

(56) References Cited

U.S. PATENT DOCUMENTS 6,819,714 B2   11/2004   Yamada et al.
7,092,576 B2    8/2006   Srinivasan et al.

(Continued)

OTHER PUBLICATIONS

Adams, M., "The JPEG-2000 Still Image Compression Standard," Joint Photographic Expert Group Conference, Crowborough: JPEG Forum Ltd, GB, 16 pages (Sep. 1, 2001).

(Continued)

*Primary Examiner* — Duy M Dang
(74) *Attorney, Agent, or Firm* — Merchant & Gould P.C.

(57) ABSTRACT

Methods and systems for delivering screen content to a client device are disclosed. One method includes, for each of a plurality of coding units corresponding to screen regions included in a screen at a particular time, classifying screen content included in the coding unit as having a content type selected from among a plurality of content types, at least one of the content types comprising a screen image type, and, based on a determination that the screen content has a screen image type, applying a progressive standards-based encoding to the screen content of that coding unit. The method also includes transmitting encoded screen content for each of the screen regions to the client device.

19 Claims, 14 Drawing Sheets

(51) Int. Cl.
*H04N 19/12* (2014.01)
*H04N 19/136* (2014.01)
*H04N 19/85* (2014.01)
*H04N 19/34* (2014.01)
*H04N 19/112* (2014.01)
*H04N 19/167* (2014.01)

(56) References Cited

U.S. PATENT DOCUMENTS

| | | |
|---|---|---|
| 7,689,051 B2 | 3/2010 | Mukerjee |
| 7,847,755 B1 | 12/2010 | Hardebeck et al. |
| 8,184,699 B2 | 5/2012 | Krishnan |
| 8,311,095 B2 | 11/2012 | Brown et al. |
| 2006/0294125 A1 | 12/2006 | Deaven |
| 2010/0104021 A1 | 4/2010 | Schmit |
| 2010/0111410 A1 | 5/2010 | Lu et al. |
| 2010/0158400 A1 | 6/2010 | Lu et al. |
| 2010/0226548 A1 | 9/2010 | Abdo et al. |
| 2011/0078532 A1 | 3/2011 | Vonog et al. |
| 2013/0039408 A1 | 2/2013 | Cohen et al. |

OTHER PUBLICATIONS

International Search Report and Written Opinion for PCT/US2014/041049 mailed Aug. 28, 2014.

Ivanov et al., "Skip Prediction and Early Termination for Fast Mode Decision in H.264/AVC", International Conference on Digital Telecommunications, http://ieeexplore.ieee.org/stamp/stamp.jsp?tp=&arnumber=1698454, 5 pages (Aug. 29, 2006).

Liu et al., "A Layered Structure Prediction Method for Mode Decision in Video Encoding", 2012 Eighth International Conference on Intelligent Information Hiding and Multimedia Signal Processing, pp. 407-410 (Jul. 18, 2012).

Puri et al., "Video Coding Using the H264/MPEG-4 AVC Compression Standard", Signal Processing: Image Communication, vol. 19, No. 9, pp. 793-849 (Oct. 2004).

Wynn, T., "RemoteFX Adaptive Graphics in Windows Server 2012 and Windows 8," Remote Desktop Services Blog, http://blogs.msdn.com/b/rds/archive/2012/08/06/remotefx-adaptive-graphics-in-windows-server-2012-and-windows-8.aspx, 5 pages (Aug. 6, 2012).

"International Preliminary Report on Patentability Issued in PCT/US2014/041049", Mailed Date: Aug. 24, 2015, 12 Pages.

SCREEN MAP AND STANDARDS-BASED PROGRESSIVE CODEC FOR SCREEN CONTENT CODING

BACKGROUND

Screen content, or data describing information displayed to a user by a computing system on a display, generally includes a number of different types of content. These can include, for example, text content, video content, static images (e.g., displays of windows or other GUI elements), and slides or other presentation materials. Increasingly, screen content is delivered remotely, for example so that two or more remote computing systems can share a common display, allowing two remotely-located individuals to view the same screen simultaneously, or otherwise in a teleconference such that a screen is shared among multiple individuals. Because screen content is delivered remotely, and due to increasing screen resolutions, it is desirable to compress this content to a size below its native bitmap size, to conserve bandwidth and improve efficiency in transmission.

Although a number of compression solutions exist for graphical data such as screen content, these compression solutions are inadequate for use with variable screen content. For example, traditional Moving Picture Experts Group (MPEG) codecs provide satisfactory compression for video content, since the compression solutions rely on differences between sequential frames. Furthermore, many devices have integrated MPEG decoders that can efficiently decode such encoded data. However, MPEG encoding does not provide substantial data compression for non-video content that may nevertheless change over time, and therefore is not typically used for screen content, in particular for remote screen display.

Methods for delivering screen content to remote systems can be inefficient, can require a large amount of data communication, and can be resource-intensive. Accordingly, strategies for compressing and efficiently representing screen content for use in connection with remote systems, including graphical content, requires substantial processing to occur on the receiving device, which uses substantial power.

SUMMARY

In summary, the present disclosure relates to a screen map and progressive standards-based codec for screen content encoding. The screen map and progressive standards-based codec allows for efficient categorization of various types of screen content, for example for distribution to a remote device. The progressive standards-based codec delivers a standards-compliant code stream to a receiving device, and therefore allows that remote device to utilize typical decoding hardware included in a receiving device. Use of a progressive standards-based codec allows for offloading of screen content decoding from a main central processing unit (CPU) of a receiving device.

In one example aspect of the present disclosure, a method of delivering screen content to a client device is disclosed. The method includes, for each of a plurality of coding units corresponding to screen regions included in a screen at a particular time, classifying screen content included in the coding unit as having a content type selected from among a plurality of content types, at least one of the content types comprising a screen image type, and, based on a determination that the screen content has a screen image type, applying a progressive standards-based encoding to the screen content of that coding unit. The method also includes transmitting encoded screen content for each of the screen regions to the client device.

In a second aspect, a system includes a classification component executing on a computing system and configured to classify screen content for each of a plurality of coding units as having a content type selected from among a plurality of content types, at least one of the content types comprising a screen image type. The system also includes one or more encoding modules executing on the computing system, the one or more encoding modules configured to apply an encoding to the screen content of a coding unit based on the content type. The one or more encoding modules are configured to apply a progressive standards-based encoding to the screen content associated with the coding units having the screen image type.

In a third aspect, a computer storage medium having computer-executable instructions stored thereon is disclosed which, when executed, cause a computing system to perform a method of delivering screen content to a client device. The method includes, for each of a plurality of coding units corresponding to screen regions included in a screen at a particular time, classifying screen content included in the coding unit as having a content type selected from among a plurality of content types, the plurality of content types including a screen image type, a video type, and a text type, and, based on a determination that the screen content has a screen image type, applying a progressive standards-based encoding to the screen content of that coding unit. For each of the plurality of coding units the method also includes, based on a determination that the screen content has a video type, applying a standards-based encoding to the screen content of that coding unit, and based on a determination that the screen content has a text type, applying a text codec to the screen content of that coding unit. The method also includes generating a screen map including metadata associated with each of the plurality of coding units, the metadata including one or more quality flags, a slides flag, a special effects flag, a motion flag, a spatial skip flag, and a temporal skip flag. The method further includes transmitting encoded screen content for each of the screen regions to the client device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
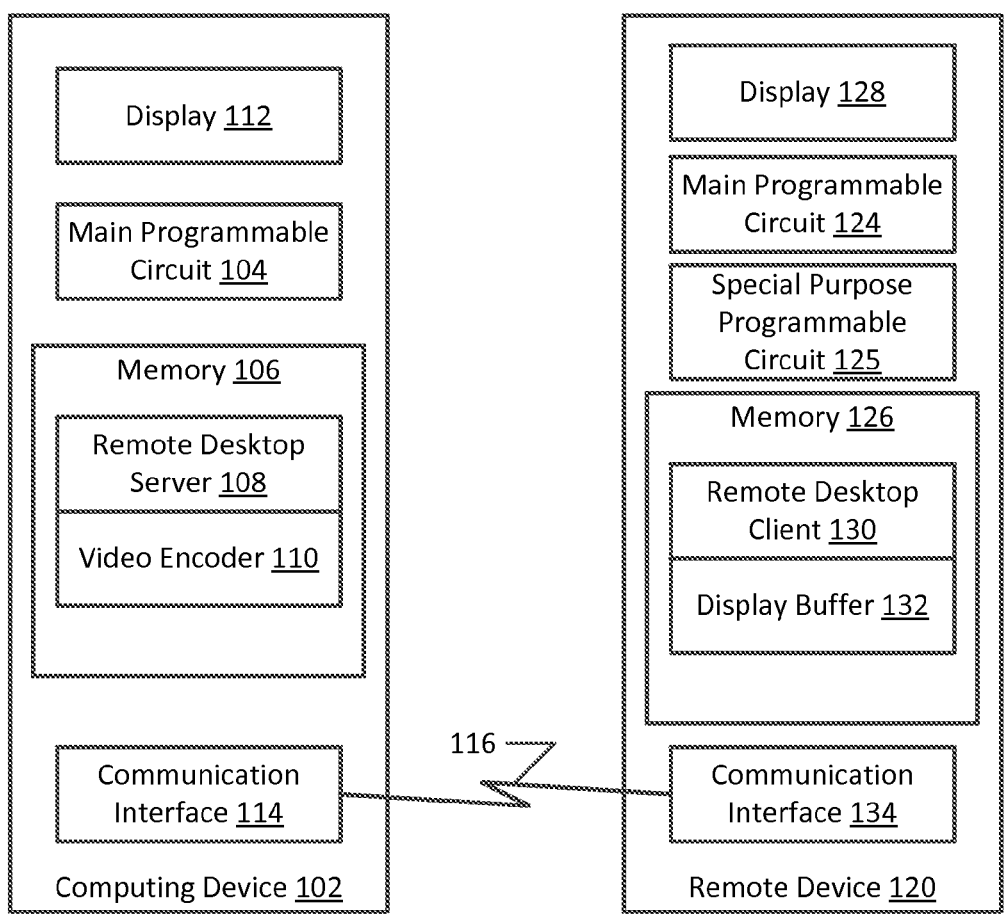
FIG. 1 illustrates an example schematic arrangement of a system in which remote screen distribution can be performed using a screen map and a standards-based progressive codec useable for screen content coding.

As briefly described above, embodiments of the present invention are directed to methods, systems, and computer-readable media useable to provide a screen map and progressive standards-based codec for screen content encoding. The screen map and progressive standards-based codec allows for efficient categorization of various types of screen content, for example for distribution to a remote device.

To address some limitations in remote screen display systems, the Remote Desktop Protocol (RDP) was developed by Microsoft Corporation of Redmond, Wash. In this protocol, a screen frame is analyzed, with different contents classified differently. For example, text data is identified and encoded using a text codec, while image data uses a proprietary progressive codec. The progressive codec and text codec provide greater compression gains than the MPEG codec, allowing for improved transmission of screen content. This allows for interactivity between users of physically distant computing systems without the lag that would otherwise be experienced when video-based content, being MPEG encoded, is buffered for display.

Although the Remote Desktop Protocol arrangement described above improves the compression and transmission characteristics of screen content, it also has disadvantages. In particular, computing devices that typically receive screen content encoded using the Remote Desktop Protocol generally require a main programmable circuit (e.g., the main central processing unit, or CPU) of the receiving device to decode the content that is encoded using the text codec and the progressive codec. This is not a significant performance issue with respect to the text codec which is a lossless codec that provides substantial compression and can be decoded quickly and without a great deal of power consumption; however, the progressive codec requires substantial processing to occur on the receiving device, which uses substantial power. Furthermore, since typical receiving devices (e.g., laptop, tablet, or smartphone devices) do not include a specific hardware decoder for the progressive codec, this computational complexity cannot be readily offloaded from the main programmable circuit of the receiving device.

As further discussed below in connection with some embodiments of the present disclosure, a screen map allows for classification of different regions of a screen at a particular time, referred to as coding units, as containing different types of content. The content types can be used to define an encoding for the screen content included in that coding unit. Concurrently, a progressive standards-based codec delivers a standards-compliant code stream to a receiving device, and therefore allows that remote device to utilize typical decoding hardware included in a receiving device. Use of a progressive standards-based codec allows for offloading of screen content decoding from a main central processing unit (CPU) of a receiving device, and improves the compression ratio of the progressive encoded screen content. Among other benefits, this improves power usage of a receiving device.

FIG. 1 illustrates an example schematic arrangement of a system 100 in which remote screen distribution can be performed using a screen map and a standards-based progressive codec useable for screen content coding. As illustrated, the system 100 includes a computing device 102, which includes a programmable circuit 104, such as a CPU. The computing device 102 further includes a memory 106 configured to store computing instructions that are executable by the programmable circuit 104. Example types of computing systems suitable for use as computing device 102 are discussed below in connection with FIGS. 12-14.

Generally, the memory 106 includes a remote desktop server component 108 and a video encoder 110. The remote desktop server component 108 generally is configured to replicate screen content presented on a local display 112 of the computing device 102 on a remote computing device, illustrated as remote device 120. In some embodiments, the remote desktop server component 108 generates content compatible with a Remote Desktop Protocol (RDP) defined by Microsoft Corporation of Redmond, Wash.

The video encoder 110 can be configured to apply any of a number of different encoding schemes, or codecs, to content, such that the content is compressed for transmission to the remote device 120. In example embodiments, the video encoder 110 can apply a standards-based codec, such as an MPEG-based codec. In particular examples, the video encoder 110 can be an MPEG encoder employing one or more codecs such as an H.264 codec. Other types of standards-based encoding schemes or codecs could be used as well.

As illustrated in FIG. 1, encoded screen content can be transmitted to a remote system 120 by a communication interface 114 of the computing system 102, which provides the encoded screen content to a communication interface 134 of the remote system 120 via a communicative connection 116 (e.g., the Internet). Generally, and as discussed below, the communicative connection 116 may have unpredictable available bandwidth, for example due to additional traffic occurring on networks forming the communicative connection 116. Accordingly, existing systems that transmit encoded screen content do so using a progressive scheme in which an initial transmission of such screen content provides a low-quality (e.g., low resolution) version of that screen content, and which is progressively improved over time (i.e., as the screen remains unchanged and bandwidth remains available).

In the context of the present disclosure, in some embodiments, a remote device 120 includes a main programmable circuit 124, such as a CPU, and a special-purpose programmable circuit 125. In example embodiments, the special-purpose programmable circuit 125 is a standards-based decoder, such as an MPEG decoder designed to encode or decode content having a particular standard (e.g., H.264). In particular embodiments, the remote device 120 corresponds to a client device either local to or remote from the computing device 102, and which acts as a client device useable to receive screen content.

In addition, the remote device includes a memory 126 and a display 128. The memory 126 includes a remote desktop client 130 and display buffer 132. The remote desktop client 130 can be, for example, a software component configured to receive and decode screen content received from the computing device 102. In some embodiments, the remote desktop client 130 is configured to receive and process screen content for presenting a remote screen on the display 128. The screen content may be, in some embodiments, transmitted according to the Remote Desktop Protocol defined by Microsoft Corporation of Redmond, Wash. The display buffer 132 stores in memory a current copy of screen content to be displayed on the display 128, for example as a bitmap in which regions can be selected and replaced when updates are needed.

As discussed further below, whereas existing systems utilize proprietary compression codecs for progressive improvement of screen content, in the context of the present disclosure a standards-based codec can be used for such progressive encoding, such as an MPEG based codec. A screen map incorporating metadata defining various characteristics of regions of a screen, such as its availability for improvement, as well as the existence of specific image transitions, motion (and the extent of such motion), or other special effects or presentation characteristics. Accordingly, using a standards-based codec allows a receiving device, such as device 120, to offload generally computationally-complex decoding processes to a special-purpose programmable circuit 125, rather than requiring use of main programmable circuit 124. It is noted that, because decoding of images can be computationally intensive, it is advantageous to offload this task to the special-purpose programmable circuit 125; however other types of content, such as text content, can be encoded using a simple (non-computationally intensive) codec, and therefore could be decoded using the main programmable circuit 124 in a comparatively efficient manner.

Figure 2:
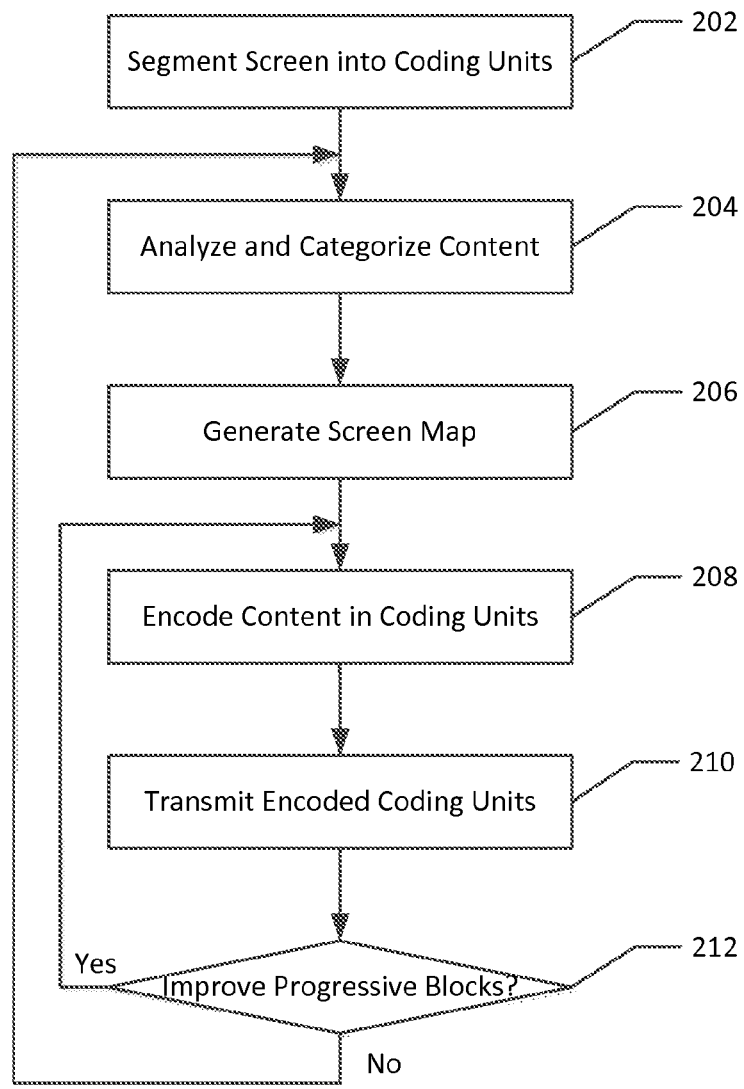
FIG. 2 illustrates a flowchart of a method for delivering compressed screen content in the form of bitstreams to a remote device, according to an example embodiment.

Referring now to FIG. 2, a flowchart of a method 200 for delivering screen content to a remote device is shown, according to an example embodiment. The method 200 can be performed, for example, by any of a variety of types of computing devices, such as computing device 102 of FIG. 1, or the computing devices of FIGS. 12-14, below.

In the embodiment shown, at operation 202 a screen (for example, the current display at a specific point in time) is segmented into a plurality of screen segments. These screen segments, defining a subset of the screen content or coding units, can be individually analyzed, categorized, and encoded using one of a number of types of encoding processes. In example embodiments, a computing device can, when running a RDP application, analyze a segmented screen.

It is noted that, in example embodiments, the number of segments into which a screen is segmented may vary. In one example embodiment, the screen can be segmented into a 16×16 array of screen regions, each corresponding to a coding unit. In further example embodiments, a 64×64 array could be used. To some extent, the size of each coding unit will be a function of the number of segments used, as well as the operational resolution of the display for which screen content is to be processed.

Figure 6A:
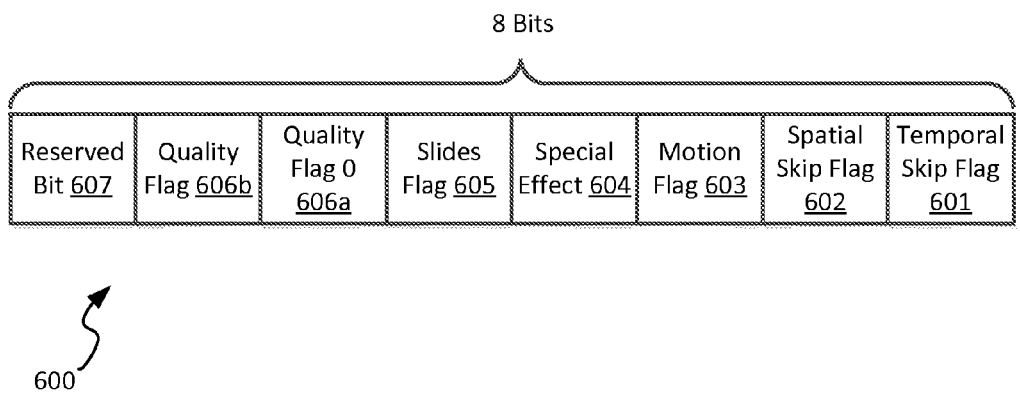
FIG. 6A is an example set of metadata useable to define characteristics of a coding unit forming a portion of a screen map.
Figure 6B:
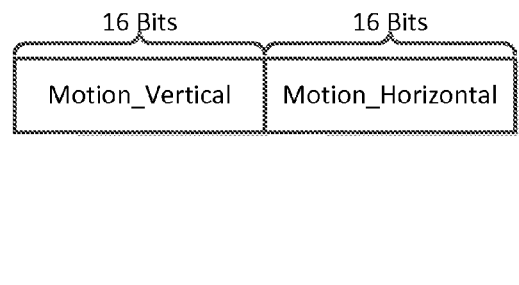
FIG. 6B is an example additional set of metadata useable to define movement of screen content for a coding unit.

At operation 204, each of the coding units is analyzed, and its content is categorized. In example embodiments, each coding unit, which includes screen content associated with a region and at a particular time, can be assessed to determine whether it contains image (e.g., presentation) data, video data, or text data. The coding unit can then be classified accordingly, allowing the corresponding sub-portion of the screen content to be classified by type, and optionally cached. Notably, different portions of screen content are capable of being classified differently. From the collection of coding units, a screen map is generated at operation 206, which corresponds to defining a logical arrangement and classification of the coding units for a particular screen. The screen map can include, for each coding unit, screen content associated with that coding unit and screen metadata associated with the coding unit, which can include information about the classification of the screen content, as well as information about how that screen content has changed or is changing. Example metadata useable within a screen map is illustrated in FIGS. 6A-B, discussed in further detail below.

Based on the classification of the screen content associated with each coding unit, in operation 208 the screen content for that coding unit is encoded according to a codec associated with various types of screen content. For example, a progressive standards-based (e.g., MPEG-based) codec could be used for image data, while a straightforward standards-based codec could be used for video data and a text codec could be used for text data. Other codecs could be used as well, associated with other types of classifications. The encoded screen content is then transmitted, in operation 210, to one or more intended recipients at remote devices, as part of encoded coding units.

As noted above, as part of the encoding process, a low-quality encoded version of a particular coding unit may be prepared which can be quickly transmitted to a remote system. This may be the case, for example, based on observed bandwidth limits, and to ensure that the coding unit can quickly be transmitted to the remote system. Accordingly, operation 212 determines whether a coding unit within the screen map can be improved. This assessment can be made, for example, based on metadata associated with the coding unit. In example embodiments, quality bits included in metadata defining a portion of a screen map associated with the coding unit can be inspected to detect whether the quality of encoded screen content is at a highest level, or whether some improvement is available. If improvement is available, operation returns to the encoding operation 208, which performs further encoding of a higher-quality version of the screen content in the coding unit, and which is subsequently transmitted to the remote system as a bitstream in operation 210. Operation 210 can also include transmission of region information to a remote system, for example to allow the remote system to discern among types of encodings for routing to appropriate corresponding processing systems, and to determine specific areas of a display to be updated. If none of the coding units has screen content whose quality can be improved, operation with respect to that particular frame has completed. As such, operational flow returns to operation 204 in which content of a next frame is analyzed and categorized for subsequent encoding.

Figure 3:
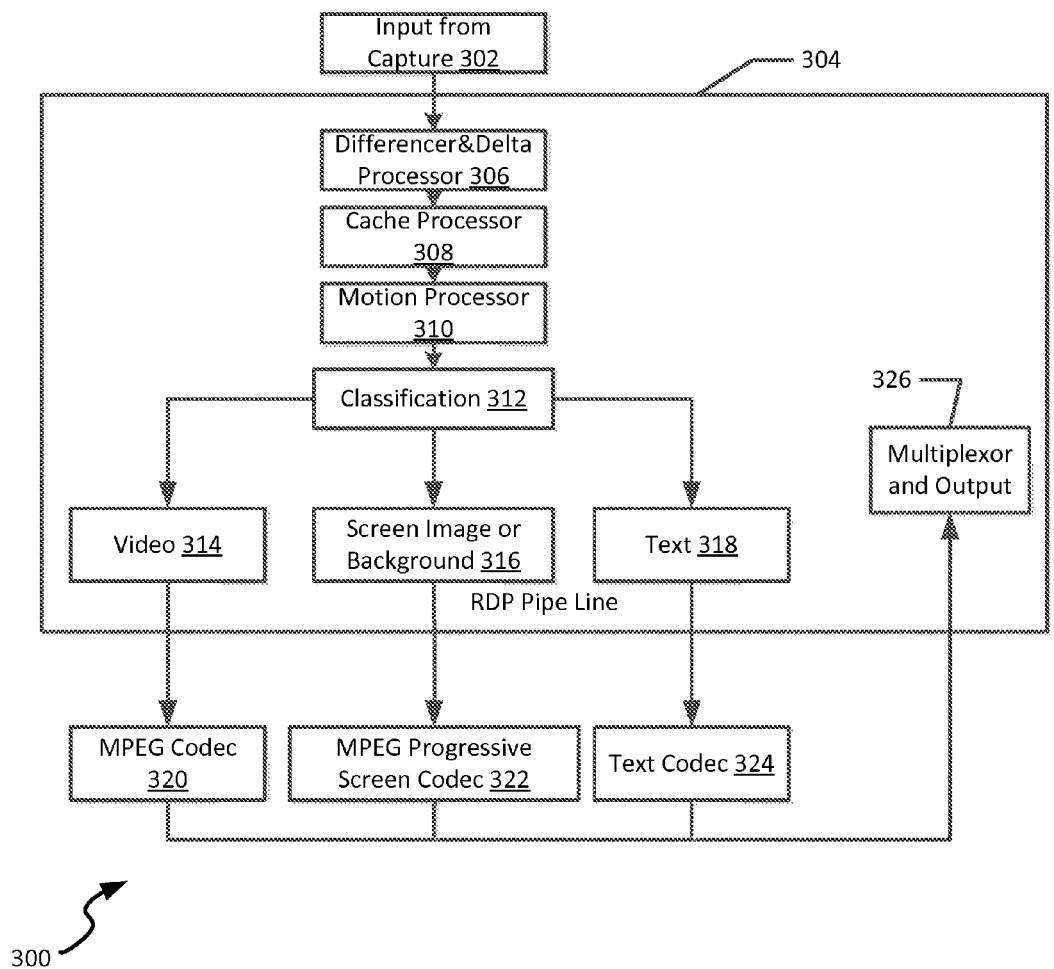
FIG. 3 is a logical block diagram of a system for delivering screen content to a remote device including a remote desktop protocol pipeline and associated progressive standards-based encoding arrangement.

FIG. 3 is a logical block diagram of a system 300 for delivering screen content to a remote device including a remote desktop protocol pipeline and associated progressive standards-based encoding arrangement. The system 300 can be, for example, implemented in a computing system used to deliver screen data to a remote system, such as by using RDP and an associated, standards-based encoder (and codec) such as MPEG.

As illustrated in FIG. 3, a screen frame is captured via a capture component 302, and provided to an RDP pipeline 304. The RDP pipeline 304 generally outputs categorized, RDP-compliant screen data and an associated screen map, for use by one or more associated encoders. In the embodiment shown, the RDP pipeline 304 includes a difference/delta processor 306, a cache processor 308, and a motion processor 310. The difference/delta processor 306 generally analyzes the captured screen content, and in particular determines whether there is a difference between the current frame and a prior frame for each coding unit. The cache processor 308 generally determines whether the same content has been previously cached in a cache dictionary, or would otherwise not be required to be re-encoded for transmission (i.e., is already present in a screen buffer at a remote device). The motion processor 310 determines whether global motion has occurred as to a particular object in a coding unit or among coding units, and can detect, in such embodiments, a vertical and horizontal movement of a particular object depicted in screen content, such that the moved object need not be re-encoded and sent to a remote system, but rather updated as to its position.

Following processors 306-310, screen content in coding units that cannot be excluded from encoding and/or retransmission on the bases discussed above (e.g., no difference occurring, prior caching, or only movement of existing objects) are provided to a classification component 312, which classifies the coding units as having a video type 314, image type 316, or text type 318. As illustrated, the RDP pipeline 304 passes the various types of classified screen content from the coding units to encoders, with each encoder providing an encoding based on a different codec. In the embodiment shown, the coding units having a video type 314 are passed to an MPEG encoder 320, coding units having an image type 316 are passed to a progressive MPEG encoder 322, and coding units having screen content of a text type 318 are passed to a text encoder 324, which applies a text codec. The output of each encoder is returned to the RDP pipeline 304, which routes the encoded screen data from each of the coding units to a multiplexor and output component 326, which orders an overall bitstream and transmits the coding units, as a bitstream, to a remote system for display. In example embodiments, the encoded (compressed) screen data can also be cached, for example in a history dictionary or other type of screen data caching arrangement.

In some embodiments, the output component 326 delivers to a remote system region information alongside or incorporated with the bitstream, which allows the remote system (e.g., a client device) to distinguish among areas to be patched with the bitstream of updated and encoded screen content. This can include, for example, coded rectangles from the MPEG encoders 320, 322, and coded rectangles from the text encoder 324.

Figure 4:
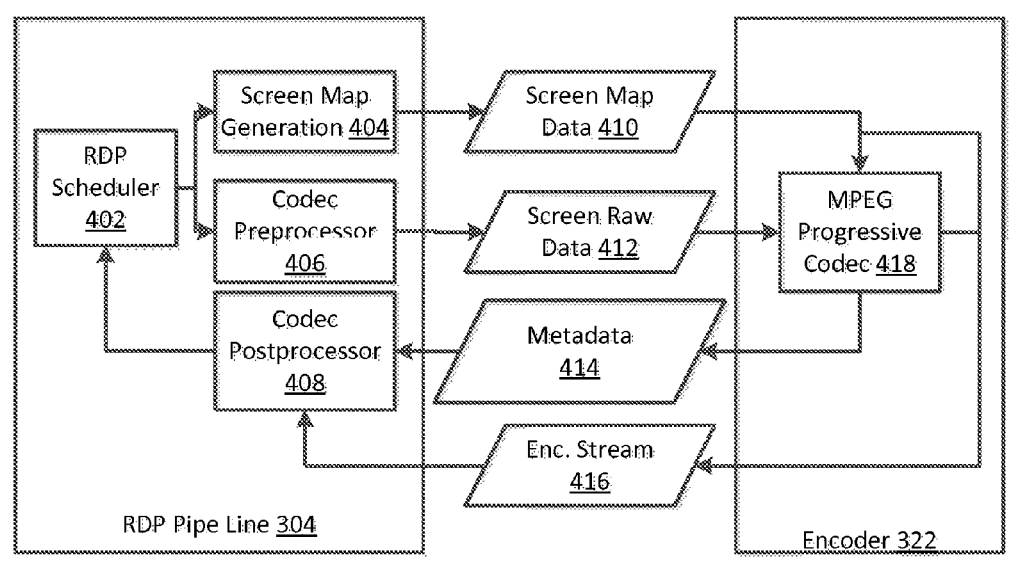
FIG. 4 is a logical data flow diagram illustrating a progression of screen content through a system as illustrated in FIG. 3.

Referring now to FIG. 4, a logical data flow diagram 400 is shown, illustrating a progression of screen content through a system as illustrated in FIG. 3, according to an example embodiment. The logical data flow diagram 400 is depicted for use with coding units that require progressive standards-based (e.g., MPEG-based) encoding, and as such can represent a data flow through a portion of the system of FIG. 3.

As illustrated in the data flow diagram 400, the RDP pipeline 304 includes an RDP scheduler 402 which coordinates a screen map generator 404 and codec pre-processor 406. The RDP pipeline 304 also includes a codec post-processor 408. The screen map generator 404 generates screen map data 410 that can be provided to the encoder 322. The screen map data 410 can be, for example, data associated with one or more coding units, including data defining regions of a screen that require encoding, as well as a type of encoding to be provided. The codec pre-processor 406 outputs raw data 412 to the encoder 322. As part of the raw data 412, the codec pre-processor 406 sends a screen raw frame (corresponding to the screen background or images), sets a bit rate, and optionally sets a low complexity flag and color conversion settings.

Encoder 322 includes, in the embodiment shown, an MPEG progressive codec 418 which receives the screen map data 410 and screen raw data 412 and generates metadata 414 associated with the screen content, as well as an encoded stream 416. As noted above, the encoder 322 can apply any type of progressive standards-based codec to the raw data 412, such as a progressive MPEG encoding, such as MPEG AVC/H.264 or MPEG HEVC/H.265.

After finishing the encoding of the coding units of a screen frame, the metadata 414, such as quantization parameters useable to assist the RDP pipeline 304 to update the screen content, is sent back to the codec postprocessor 408. The encoded bitstreams 416 are also sent to the codec postprocessor 408, which will forward the encoded bitstream into the RDP scheduler 402 for delivery to a remote device. The codec postprocessor 408 can inform the capture component 302 (e.g. screen or display capture) to stop sending raw data if the quality of one or more regions has reached a threshold at which a human eye cannot detect distortion in the image.

Figure 5:
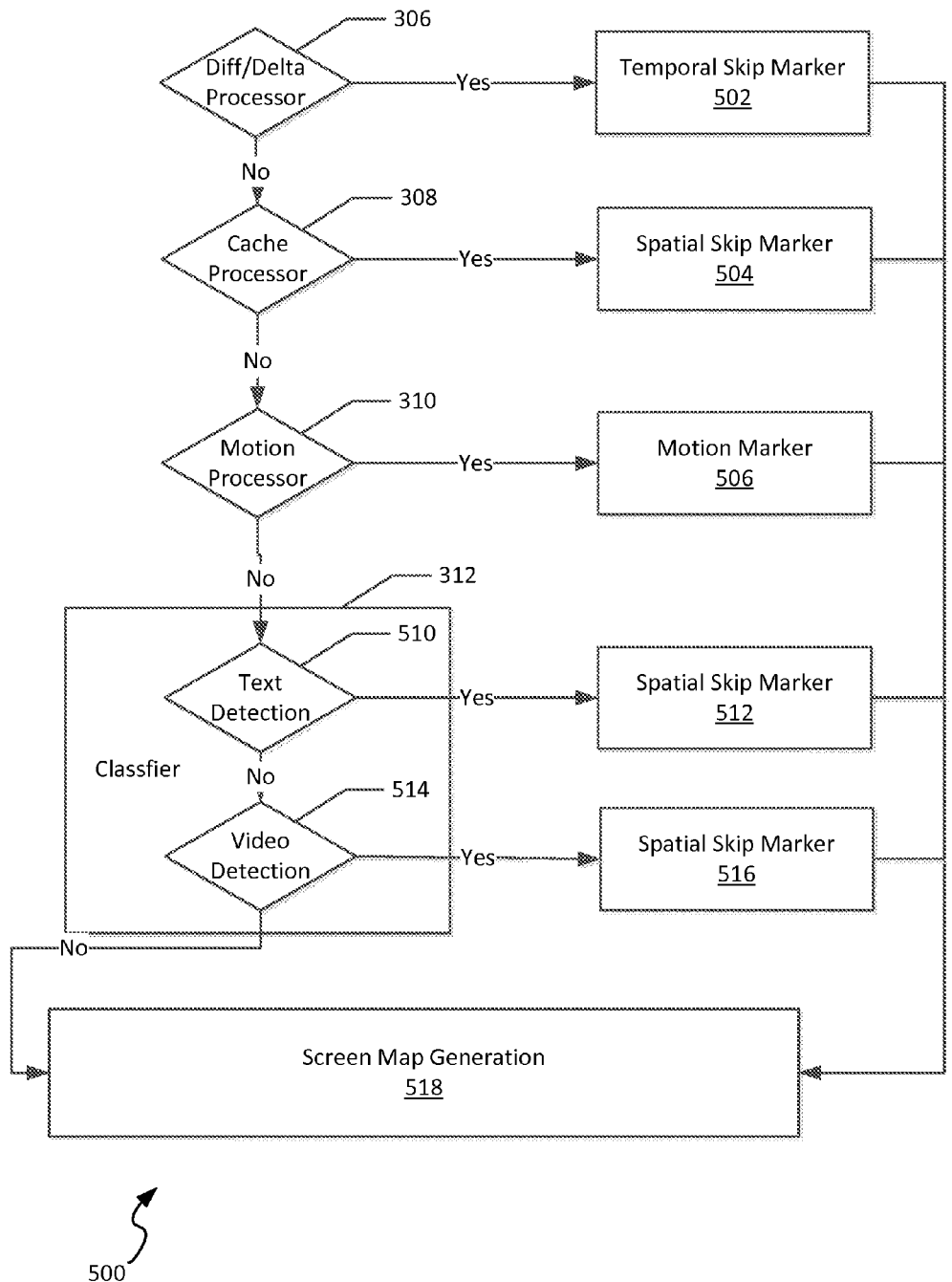
FIG. 5 is a flowchart of a process for generating a screen map useable to assist in coding screen content and delivering compressed bitstreams to a remote device, according to an example embodiment.

Referring now to FIG. 5, a flowchart of a process 500 for generating a screen map useable to assist in encoding screen content to compressed bitstreams that can be delivered to a remote device is shown, according to an example embodiment. The process 500 can, in example embodiments, represent a set of decisions made by the system 300 of FIG. 3 relative to a screen.

In the embodiment shown, difference/delta processor 306 determines if any changes have taken place when comparing a current frame and a preceding frame. If no changes are present, the difference/delta processor 306 determines that there is no change (branching "yes", thereby indicating that the difference/delta processor 306 has detected a same previous frame), and generating a temporal skip marker 502. However, if changes are present, the difference/delta processor 306 determines that changes have occurred, and therefore encoding cannot be skipped; a "no" branch is taken, to the cache processor 308. Cache processor 308 determines if a cache dictionary contains the content in the current frame; if the screen content is cached, the cache processor 308 branches "yes" to generate a spatial skip marker 504. If the screen content is not cached in the cache dictionary, the cache processor branches "no" to the motion processor 310.

In the embodiment shown, motion processor 310 generates a motion vector and motion marker based on the output screen frame from the cache processor and a previous screen frame. The motion processor 310 generates a motion marker 506 (branching "yes"), or transitions to classification component 312. In addition, global motion vectors are generated by the motion processor 310.

The classification component 312 includes a text detection operation 510, which detects whether text exists in the screen content; if so, a spatial skip marker 512 is generated. A video detection operation 514 detects whether video exists in the screen content; if so, a further spatial skip marker 516 is generated. Finally, the overall screen data is passed to a screen map generation component 518, and all of the spatial skip markers and motion vectors are passed to the screen map generation component 518 as well. The screen map generation component 518 gathers the various markers 502, 504, 506, 512, 516, and generates a screen map indicating specific coding units that include the various types of content.

FIG. 6A is an example set of metadata 600 useable to define characteristics of a coding unit forming a portion of a screen map. The metadata 600 is, in some embodiments, a result of the process 500 of FIG. 5 in generating a screen map for each of a plurality of coding units. Generally, the screen map corresponds to a collection of metadata associated with each of the plurality of coding units such that the type of screen content (e.g., image, video, or text) is indicated, as well as various other characteristics of that coding unit.

In the embodiment shown, an 8-bit area defines flags used for a coding unit, also referred to herein as a macroblock in MPEG AVC/H.264. In the embodiment shown, a temporal skip flag 601 defines the existence of a temporal skip, meaning no changes have taken place since the prior frame. A spatial skip flag 602 identifies whether a spatial skip has been detected for that coding unit, for example as determined using the process 500 of FIG. 5. A motion flag 603 identifies whether motion exists within the coding unit, and a special effects flag 604 identifies whether a special effects motion exists in the coding unit, such as a fade in/out, fast-scrolling, or some other known motion effect. A slides flag 605 indicates whether the current content is slides-based content, such as in a presentation application (e.g., Microsoft Power-Point®), or in an image-based Portable Document Format (PDF). Quality bits 606a-b provide a four-level quality control for levels of quality to use in progressive encoding and delivery of screen content. One or more bits, shown as bit 607, can be reserved for future use.

As illustrated in FIG. 6B, an example additional set of metadata 620 is shown that is useable to define movement of screen content for a coding unit. In the embodiment shown, the metadata 620 defines a motion vector to be used when the motion flag 603 is set, and includes a 16 bit value for each of the vertical and horizontal components of the motion vector.

Figure 7:
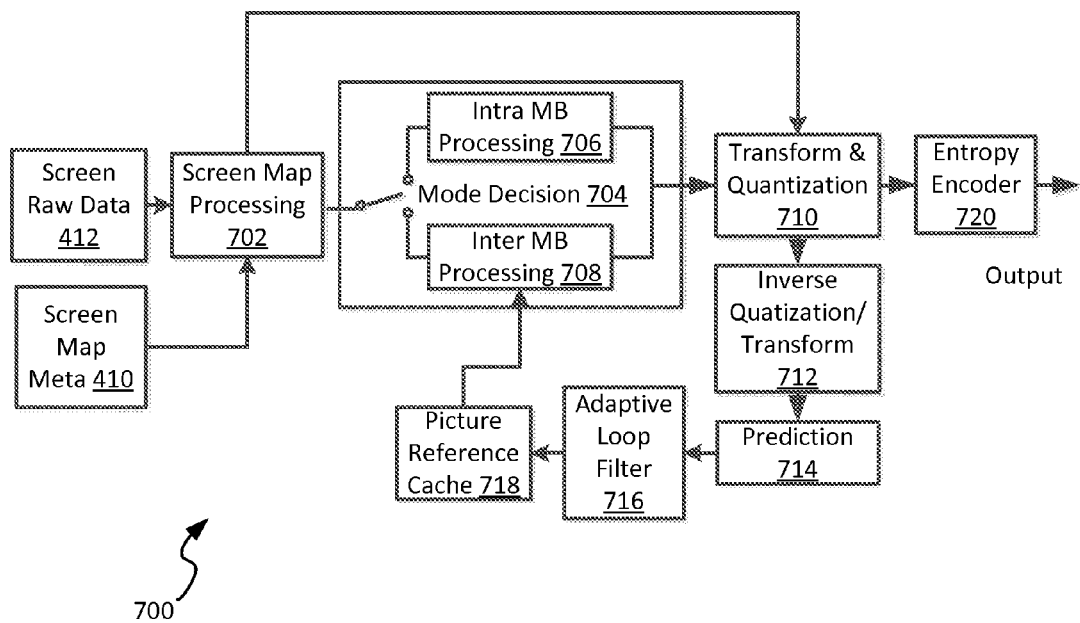
FIG. 7 is a flowchart illustrating operation of a progressive standards-based encoder and associated screen map, according to an example embodiment.

FIG. 7 is a flowchart illustrating operational components 700 of a progressive standards-based encoder using an associated screen map, according to an example embodiment. As illustrated, screen raw data 412 and screen map metadata 410 (from FIG. 4) are provided to screen map processing component 702. The screen map processing component 702 determines whether to skip processing of the particular screen content, alongside an encoding mode decision block 704. The mode decision block 704 includes an intra macroblock processing component 706 and an inter macroblock processing component 708, discussed in further detail below. However, from the screen map processing component 702 or the mode decision block 704, a transform & quantization component 710 is reached, which in some cases marks a coded block pattern (CBP) and prepares the coding unit for further processing. However, in cases where the mode is fully skipped, mode decision block 704 is bypassed entirely, and therefore it is possible that no transform or quantization is performed.

In the event the screen map processing component 702 determines that the mode decision block 704 should be entered for a particular screen map, one or both of a intra macroblock processing component 706 and an inter macroblock processing component 708 are executed, and are used to generate mode decisions as are available in existing encoding specifications, e.g., the MPEG codec. In general the mode decision block 704 selects from among components 706, 708, and it can use the flags identified in the screen map metadata 600, 620; the frame type or the rate distortion results can also be used to select mode.

After one of components 706, 708 are executed from the mode decision block 704, the transform & quantization component 710 generates quantized coefficients for the processed screen content. An inverse quantization and transform component 712 reconstructs a frame with prediction 714, while an adaptive filter 716 smooths reconstruction of the frame, using the prediction 714 from the inverse quantization and transform component 712. A picture reference cache 718 is then updated for purposes of motion estimation, which is then provided to the inter macroblock processing component 708. Concurrently from the transform & quantization component 710, an entropy encoder 720 receives the quantized coefficients, and generates encoding bitstreams.

Figure 8:
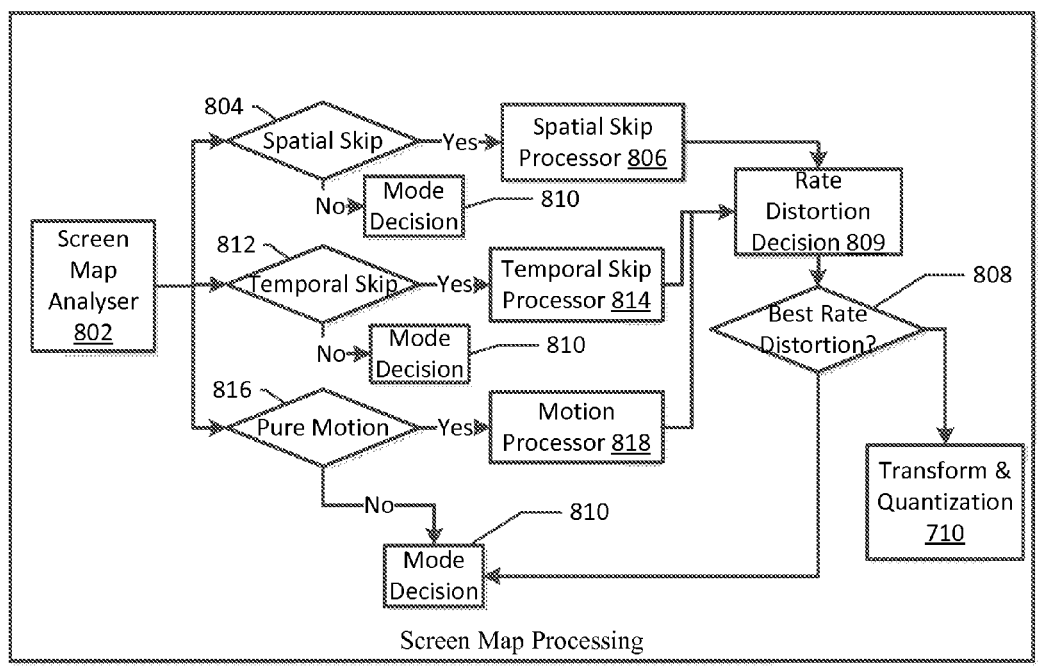
FIG. 8 is a flowchart illustrating operation of a screen map processing component, according to an example embodiment.

FIG. 8 is a flowchart illustrating operation of a screen map processing component 702, according to an example embodiment. The screen map processing component 702 includes, in the embodiment shown, a screen map analyzer 802, which analyzes an input screen map (e.g., screen map metadata 410, which can include aggregated metadata 600 for each of the coding units present). Based on the results of this analysis, if the encoding macroblock is a type of spatial skip marker (e.g., in operation 804 based on the spatial skip flag 602 in metadata 600), a spatial skip processor 806 is called to process the macroblock, and the output of the spatial skip processor 806 is passed to a rate distortion decision 809. If the results of the spatial skip processor 806 is better than a predetermined threshold (at operation 808), the result is forwarded to the transform & quantization component 710; otherwise, a normal macroblock encoding processing component (e.g., a mode decision 810) is called.

Similar processes exist for temporal skips and motion decisions indicated in the screen map. In particular, for temporal skips, screen map analyzer 802 would call, based on an operation 812, a temporal skip processor 814, which processes the macroblock and outputs to the rate distortion decision 809. Similarly, for motion decisions, screen map analyzer 802 would call, based on an operation 816 that assesses motion flag 603 in metadata 600, a motion processor 818, which also processes the macroblock and outputs to the rate distortion decision 809.

To the extent that none of the metadata flags are set, mode decisions 810 are entered, to select a particular mode for encoding of the screen content in the coding unit. The mode decisions 810 include a set of standardized decisions about how to decide a type of coding region and how best to encode the particular frame in an MPEG encoding scheme (e.g., traditional MPEG AVC/H.264 encoding). In accordance with the present disclosure, the output of the mode decisions 810 is a standard encoding of each coding unit.

With respect to mode decisions 810, it is noted that additional mode decisions could be implemented to allow for improved encoding and compression; however, in the embodiment shown, the mode decisions are compliant with a standardized codec or encoding scheme, thereby ensuring that the output of the overall system is in conformance, and capable of being received and processed by a compliant hardware decoder, as mentioned above with respect to the remote device 120 of FIG. 1.

Figure 9:
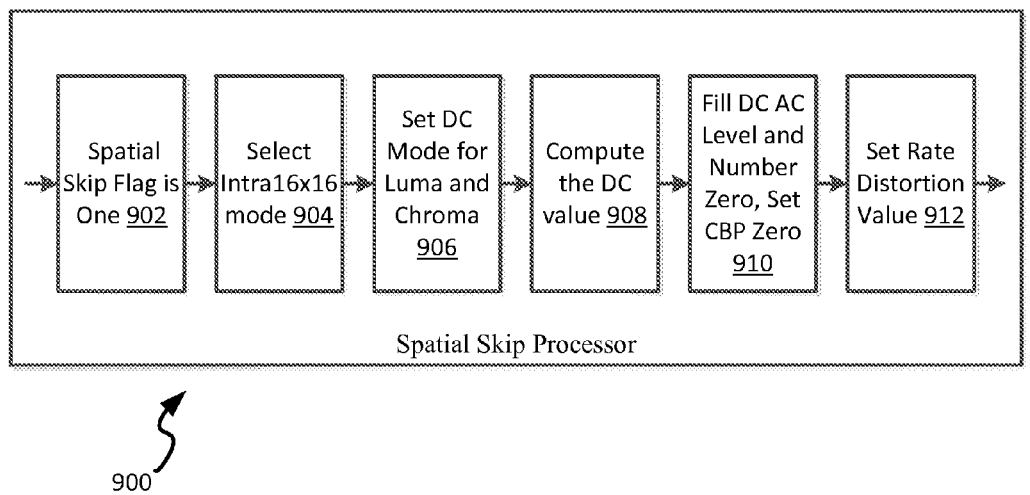
FIG. 9 is a block diagram of an example spatial skip processor useable within the methods and systems described herein.

FIG. 9 is a block diagram of an example spatial skip processor 900 useable within the methods and systems described herein. The spatial skip processor 900 can be used, for example, as spatial skip processor 806 of FIG. 8. In the embodiment shown, the spatial skip processor 900 first detects at operation 902 a spatial skip flag 602 in the metadata 600 associated with a particular coding unit. If the spatial skip flag 602 is set (and the frame is an I frame), the macroblock encoding mode is set to an intra block encoding, using, in the embodiment shown, a 16×16 coding unit arrangement (in operation 904). A DC mode is then selected at operation 906 for both luma and chroma characteristics. Direct current (DC) values, corresponding to an average value across a block, are next obtained at operation 908, for example based on the top and leftmost macroblock of the current macroblock, useable for reconstruction. At operation 910, alternating current (AC) and DC values, corresponding to sinusoidal and average value transform coefficients, are zero-filled, and the coded block pattern (CBP) is also set to zero. At operation 912, the rate distortion value is set, for example to optimize rate distortion. It is noted that in the event the frame received at screen map processing component 702 of FIGS. 7-8 is a P frame, the spatial skip processor 900 can be avoided by using a P_MB_SKIP, which saves additional bits relative to the above spatial skip process.

Figure 10:
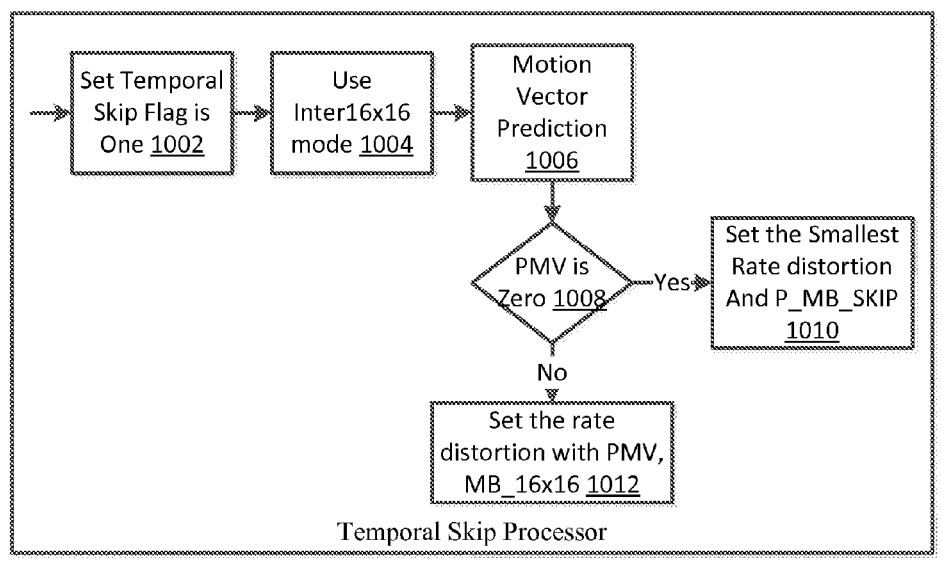
FIG. 10 is a block diagram of an example temporal skip processor useable within the methods and systems described herein.

FIG. 10 is a block diagram of an example temporal skip processor 1000 useable within the methods and systems described herein. The temporal skip processor 1000 can be used, for example, as temporal skip processor 814 of FIG. 8. In the embodiment shown, the temporal skip processor 1000 checks a temporal skip flag at operation 1002. At operation 1004, an inter_16×16 mode (or analogous mode maximizing a number of coding units) is selected, and a motion prediction operation 1006 generates a predicted motion vector (MV) based on a neighboring macroblock of the current macroblock. The predicted motion vector is assessed at operation 1008; based on the predicted MV value, the encoding MB mode can be set to skip the block (e.g., P_MB_SKIP) (e.g., if the PMV is zero), otherwise, the rate of the rate distortion model is set as the predicted MV and the macroblock mode is set as MB_16×16.

Figure 11:
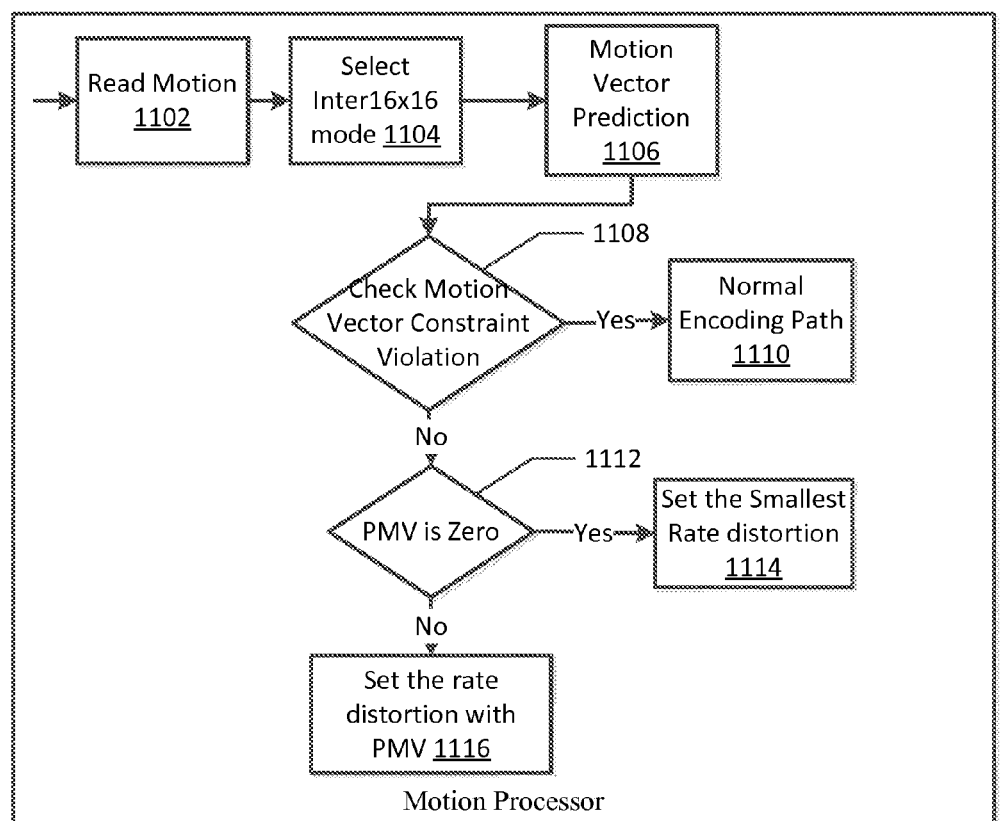
FIG. 11 is a block diagram of an example motion processor useable within the methods and systems described herein.

FIG. 11 is a block diagram of an example motion processor 1100 useable within the methods and systems described herein. The motion processor 1100 can be used, for example, as motion processor 818 of FIG. 8. In the embodiment shown, the motion processor 1100 includes a motion read operation 1102, which reads motion flags 606a-b of the screen map 600 in the current corresponding macroblock. At operation 1104, an inter_16×16 mode (or analogous mode maximizing a number of coding units) is selected, and a motion prediction operation 1106 generates a predicted motion vector (MV) based on a neighboring macroblock of the current macroblock. The motion vector constraint is then assessed in operation 1108, together with the predicted motion vector. If violated, the normal intra/inter MB processing operation 1110 should be run (e.g., as illustrated in mode decision block 704 FIG. 7). Otherwise, based on the predicted MV value (as determined at operation 1112), if it is zero, the encoding macroblock mode can be set to skip processing of the block (e.g., by setting P_MB_SKIP), and the rate distortion is minimized at operation 1114. If the predicted MV value is non-zero, at operation 1116 the rate of the distortion model is set as the predicted MV and set the MB mode as MB_16×16.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. Furthermore, multiple codecs can be run in different devices, and bitstreams multiplexed together. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 12:
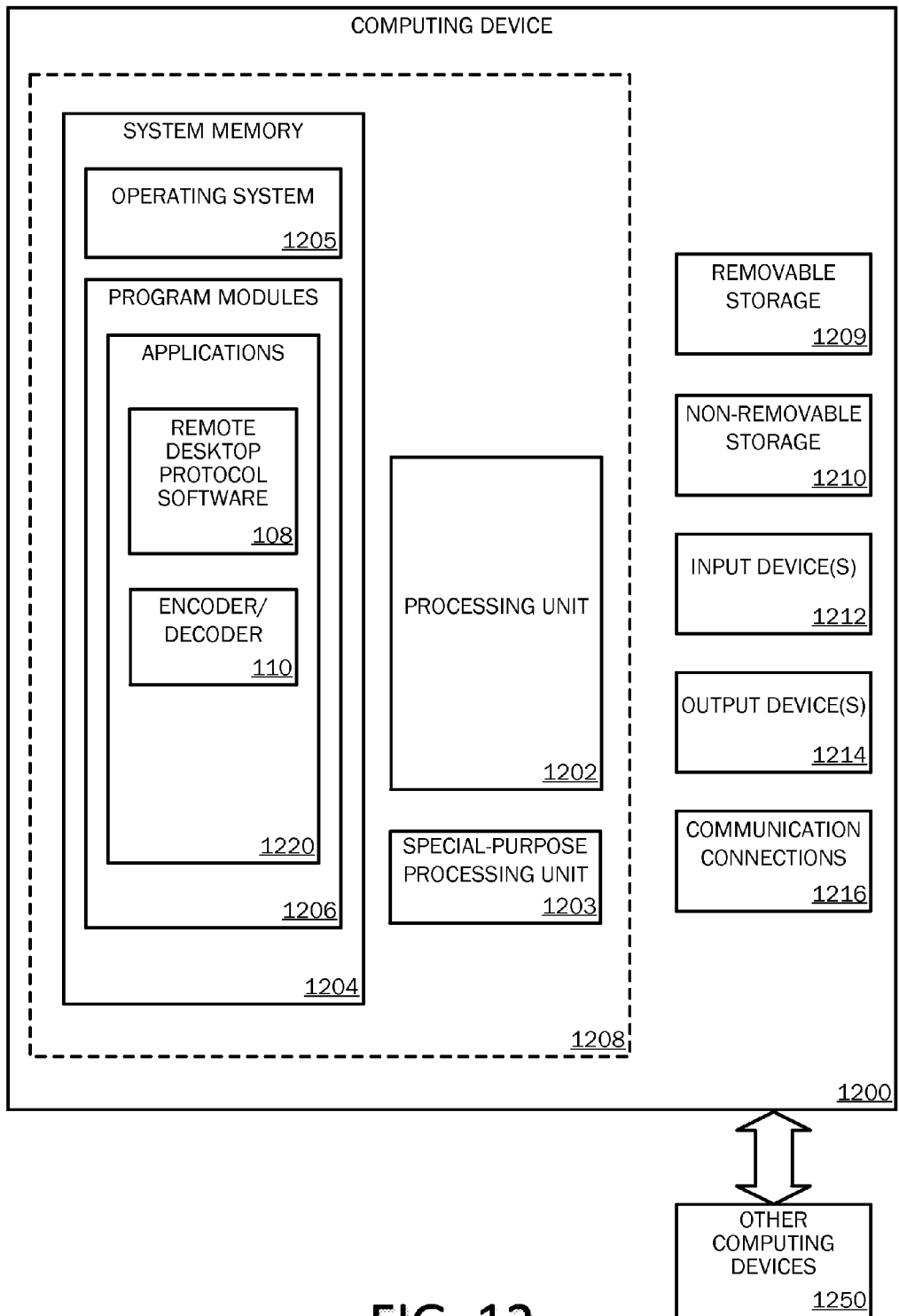
FIG. 12 is a block diagram illustrating example physical components of a computing device with which embodiments of the invention may be practiced.
Figure 13A:
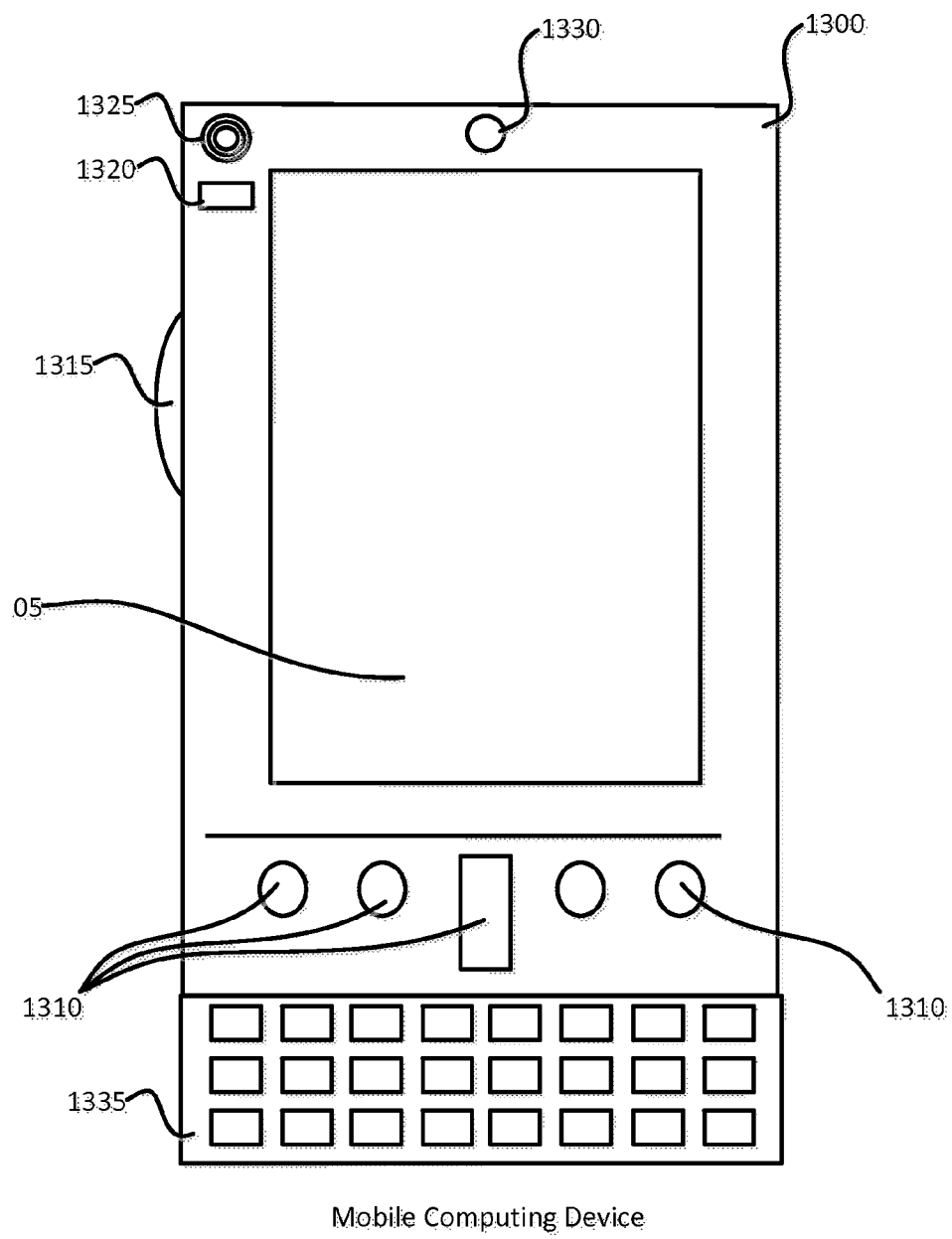
FIGS. 13A and 13B are simplified block diagrams of a mobile computing device with which embodiments of the present invention may be practiced.
Figure 13B:
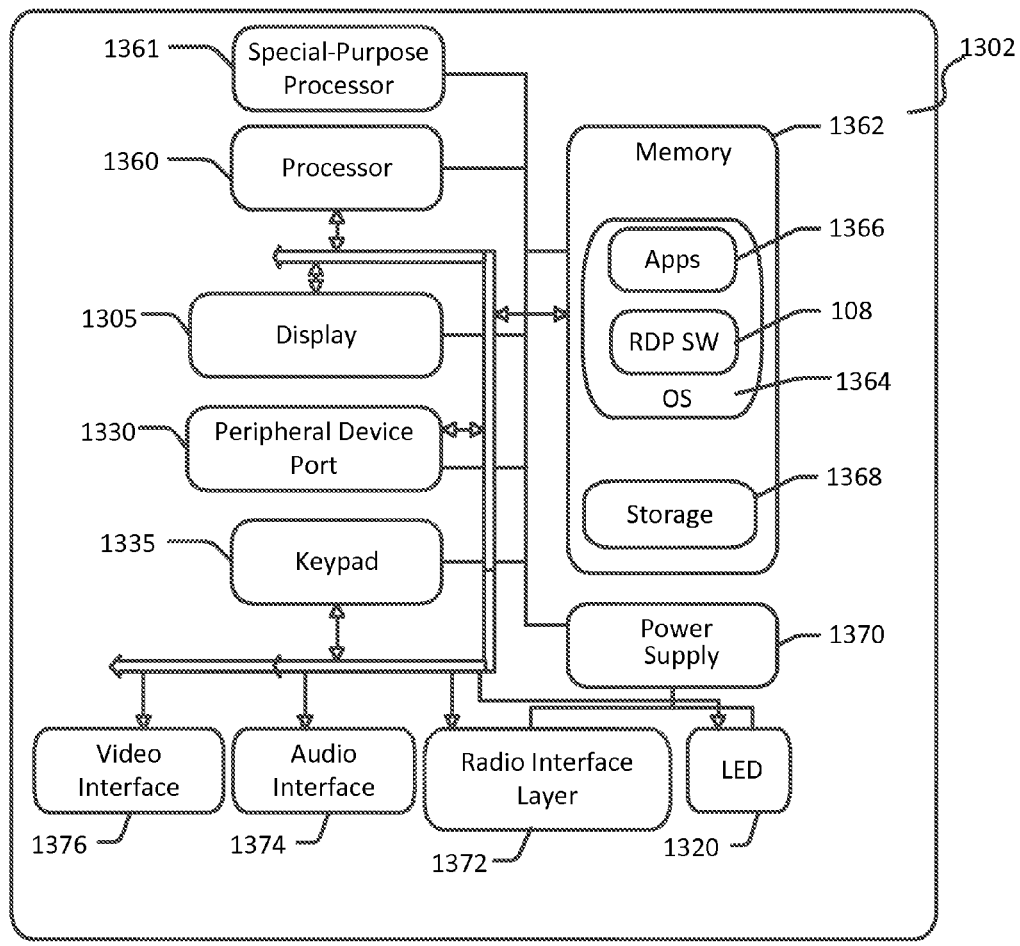
Figure 14:
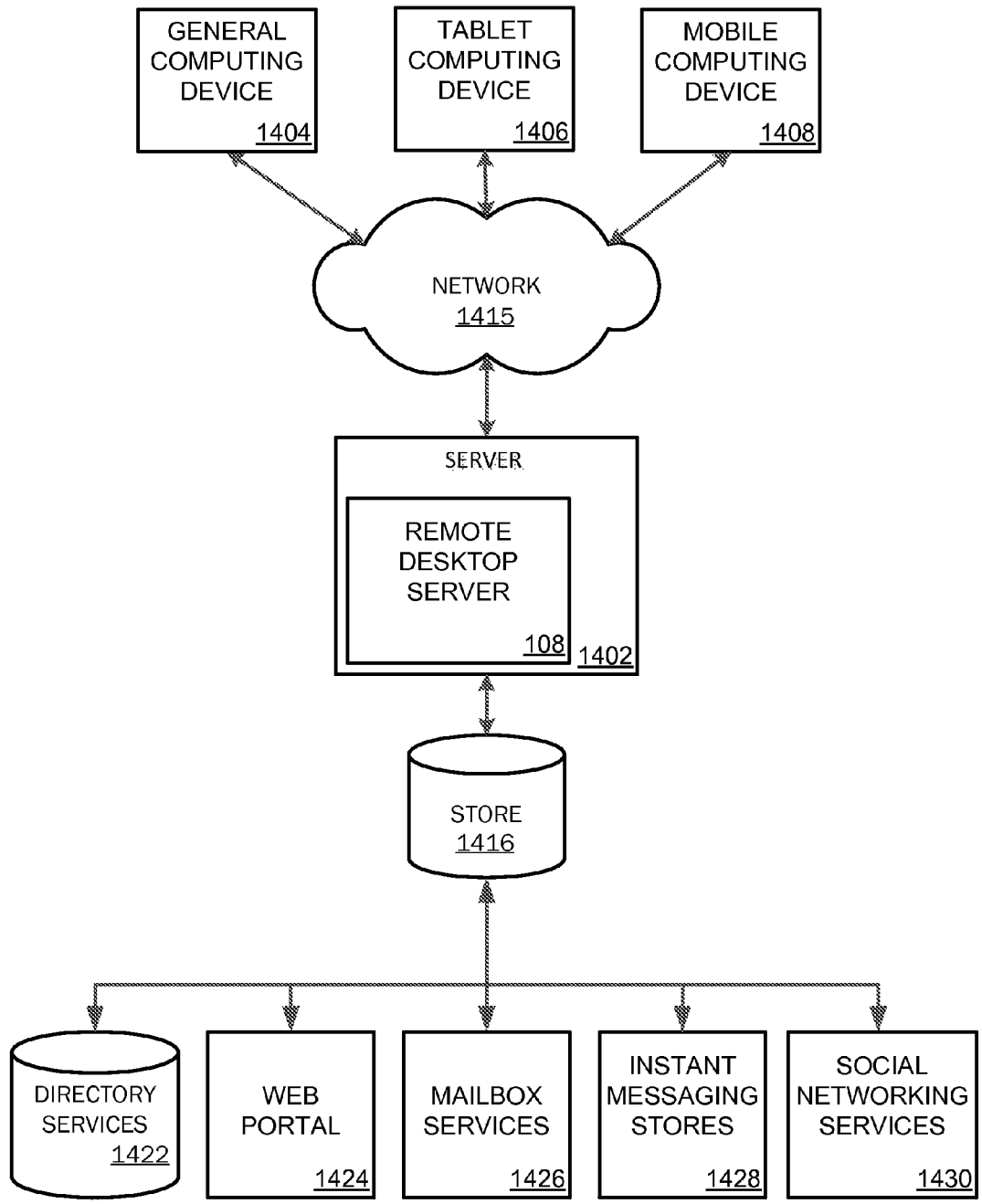
FIG. 14 is a simplified block diagram of a distributed computing system in which embodiments of the present invention may be practiced.

FIGS. 12-14 and the associated descriptions provide a discussion of a variety of operating environments in which embodiments of the invention may be practiced. However, the devices and systems illustrated and discussed with respect to FIGS. 12-14 are for purposes of example and illustration and are not limiting of a vast number of computing device configurations that may be utilized for practicing embodiments of the invention, described herein.

FIG. 12 is a block diagram illustrating physical components (i.e., hardware) of a computing device 1200 with which embodiments of the invention may be practiced. The computing device components described below may be suitable for the computing devices described above. In a basic configuration, the computing device 1200 may include at least one processing unit 1202 and a system memory 1204. Depending on the configuration and type of computing device, the system memory 1204 may comprise, but is not limited to, volatile storage (e.g., random access memory), non-volatile storage (e.g., read-only memory), flash memory, or any combination of such memories. The system memory 1204 may include an operating system 1205 and one or more program modules 1206 suitable for running software applications 1220 such as the remote desktop protocol software 108 and encoder/decoder 110 discussed above in connection with FIG. 1. The operating system 1205, for example, may be suitable for controlling the operation of the computing device 1200. Furthermore, embodiments of the invention may be practiced in conjunction with a graphics library, other operating systems, or any other application program and is not limited to any particular application or system. This basic configuration is illustrated in FIG. 12 by those components within a dashed line 1208. The computing device 1200 may have additional features or functionality. For example, the computing device 1200 may also include additional data storage devices (removable and/or non-removable) such as, for example, magnetic disks, optical disks, or tape. Such additional storage is illustrated in FIG. 12 by a removable storage device 1209 and a non-removable storage device 1210.

As stated above, a number of program modules and data files may be stored in the system memory 1204. While executing on the processing unit 1202, the program modules 1206 (e.g., remote desktop protocol software 108 and encoder/decoder 110) may perform processes including, but not limited to, one or more of the stages of the method 200 illustrated in FIG. 2. Other program modules that may be used in accordance with embodiments of the present invention, and in particular to generate screen content, may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 12 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the remote desktop protocol software 108 and encoder/decoder 110 may be operated via application-specific logic integrated with other components of the computing device 1200 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1200 may also have one or more input device(s) 1212 such as a keyboard, a mouse, a pen, a sound input device, a touch input device, etc. The output device(s) 1214 such as a display, speakers, a printer, etc. may also be included. The aforementioned devices are examples and others may be used. The computing device 1200 may include one or more communication connections 1216 allowing communications with other computing devices 1218. Examples of suitable communication connections 1216 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1204, the removable storage device 1209, and the non-removable storage device 1210 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1200. Any such computer storage media may be part of the computing device 1200. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 13A and 13B illustrate a mobile computing device 1300, for example, a mobile telephone, a smart phone, a tablet personal computer 1310, a laptop computer, and the like, with which embodiments of the invention may be practiced. With reference to FIG. 13A, one embodiment of a mobile computing device 1300 for implementing the embodiments is illustrated. In a basic configuration, the mobile computing device 1300 is a handheld computer having both input elements and output elements. The mobile computing device 1300 typically includes a display 1305 and one or more input buttons 1310 that allow the user to enter information into the mobile computing device 1300. The display 1305 of the mobile computing device 1300 may also function as an input device (e.g., a touch screen display). If included, an optional side input element 1315 allows further user input. The side input element 1315 may be a rotary switch, a button, or any other type of manual input element. In alternative embodiments, mobile computing device 1300 may incorporate more or less input elements. For example, the display 1305 may not be a touch screen in some embodiments. In yet another alternative embodiment, the mobile computing device 1300 is a portable phone system, such as a cellular phone. The mobile computing device 1300 may also include an optional keypad 1335. Optional keypad 1335 may be a physical keypad or a "soft" keypad generated on the touch screen display. In various embodiments, the output elements include the display 805 for showing a graphical user interface (GUI), a visual indicator 1320 (e.g., a light emitting diode), and/or an audio transducer 1325 (e.g., a speaker). In some embodiments, the mobile computing device 1300 incorporates a vibration transducer for providing the user with tactile feedback. In yet another embodiment, the mobile computing device 1300 incorporates input and/or output ports, such as an audio input (e.g., a microphone jack), an audio output (e.g., a headphone jack), and a video output (e.g., a HDMI port) for sending signals to or receiving signals from an external device.

FIG. 13B is a block diagram illustrating the architecture of one embodiment of a mobile computing device. That is, the mobile computing device 1300 can incorporate a system (i.e., an architecture) 1302 to implement some embodiments. In one embodiment, the system 802 is implemented as a "smart phone" capable of running one or more applications (e.g., browser, e-mail, calendaring, contact managers, messaging clients, games, and media clients/players). In some embodiments, the system 1302 is integrated as a computing device, such as an integrated personal digital assistant (PDA) and wireless phone.

One or more application programs 1366 may be loaded into the memory 1362 and run on or in association with the operating system 1364. Examples of the application programs include phone dialer programs, e-mail programs, personal information management (PIM) programs, word processing programs, spreadsheet programs, Internet browser programs, messaging programs, and so forth. The system 1302 also includes a non-volatile storage area 1368 within the memory 1362. The non-volatile storage area 1368 may be used to store persistent information that should not be lost if the system 1302 is powered down. The application programs 1366 may use and store information in the non-volatile storage area 1368, such as e-mail or other messages used by an e-mail application, and the like. A synchronization application (not shown) also resides on the system 1302 and is programmed to interact with a corresponding synchronization application resident on a host computer to keep the information stored in the non-volatile storage area 1368 synchronized with corresponding information stored at the host computer. As should be appreciated, other applications may be loaded into the memory 1362 and run on the mobile computing device 800, including the remote desktop software 108 (and/or optionally encoder software 110, or remote desktop client software 130) described herein.

The system 1302 has a power supply 1370, which may be implemented as one or more batteries. The power supply 1370 might further include an external power source, such as an AC adapter or a powered docking cradle that supplements or recharges the batteries.

The system 1302 may also include a radio 1372 that performs the function of transmitting and receiving radio frequency communications. The radio 1372 facilitates wireless connectivity between the system 1302 and the "outside world," via a communications carrier or service provider. Transmissions to and from the radio 1372 are conducted under control of the operating system 1364. In other words, communications received by the radio 1372 may be disseminated to the application programs 1366 via the operating system 1364, and vice versa.

The visual indicator 1320 may be used to provide visual notifications, and/or an audio interface 1374 may be used for producing audible notifications via the audio transducer 1325. In the illustrated embodiment, the visual indicator 1320 is a light emitting diode (LED) and the audio transducer 1325 is a speaker. These devices may be directly coupled to the power supply 1370 so that when activated, they remain on for a duration dictated by the notification mechanism even though the processor 1360 and other components might shut down for conserving battery power. The LED may be programmed to remain on indefinitely until the user takes action to indicate the powered-on status of the device. The audio interface 1374 is used to provide audible signals to and receive audible signals from the user. For example, in addition to being coupled to the audio transducer 1325, the audio interface 1374 may also be coupled to a microphone to receive audible input, such as to facilitate a telephone conversation. In accordance with embodiments of the present invention, the microphone may also serve as an audio sensor to facilitate control of notifications, as will be described below. The system 1302 may further include a video interface 1376 that enables an operation of an on-board camera 1330 to record still images, video stream, and the like.

A mobile computing device 1300 implementing the system 1302 may have additional features or functionality. For example, the mobile computing device 1300 may also include additional data storage devices (removable and/or non-removable) such as, magnetic disks, optical disks, or tape. Such additional storage is illustrated in FIG. 13B by the non-volatile storage area 1368.

Data/information generated or captured by the mobile computing device 1300 and stored via the system 1302 may be stored locally on the mobile computing device 1300, as described above, or the data may be stored on any number of storage media that may be accessed by the device via the radio 1372 or via a wired connection between the mobile computing device 1300 and a separate computing device associated with the mobile computing device 1300, for example, a server computer in a distributed computing network, such as the Internet. As should be appreciated such data/information may be accessed via the mobile computing device 1300 via the radio 1372 or via a distributed computing network. Similarly, such data/information may be readily transferred between computing devices for storage and use according to well-known data/information transfer and storage means, including electronic mail and collaborative data/information sharing systems.

FIG. 14 illustrates one embodiment of the architecture of a system for providing detection and grouping of graphics elements in a fixed format document to one or more client devices, as described above. Content displayed at server device 1402 may be stored in different communication channels or other storage types. For example, various documents may be stored using a directory service 1422, a web portal 1424, a mailbox service 1426, an instant messaging store 1428, or a social networking site 1430. The remote desktop protocol software 108 may generate RDP-compliant, MPEG-compliant (or other standards-compliant) data streams for display at a remote system, for example over the web, e.g., through a network 1415. By way of example, the client computing device may be implemented as the computing device 102 or remote device 120 and embodied in a personal computer 1404, a tablet computing device 1406 and/or a mobile computing device 1408 (e.g., a smart phone). Any of these embodiments of the client computing device 102, 130, 1200, 1300, 1406, 1408 may obtain content from the store 1416, in addition to receiving RDP-compliant and standards-compliant display data, and can include a special-purpose, standards-based hardware component for decoding such standards-based, progressive encoded RDP data.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A method of compressing screen content for delivery to a client device, the method comprising:
  for each of a plurality of coding units corresponding to screen regions included in a screen at a particular time:
    classifying screen content, wherein screen content comprises data describing information displayed on a display, the screen content included in the coding unit as having a content type selected from among a plurality of content types, at least one of the content types comprising an image type; and based on a determination that the screen content has a image type, applying a progressive standards-based encoding to the screen content of that coding unit;
based on the classification of the screen content in each coding unit, assigning metadata including information about the classification of the screen content to each coding unit;
generating a screen map including the metadata associated with each of the plurality of coding units, the metadata defining to a receiving device whether the screen region associated with each coding unit can be decoded by a special-purpose programmable circuit of the receiving device; and
transmitting compressed screen content bitstreams for each of the screen regions to the client device.

2. The method of claim 1, wherein the standards-based encoding comprises MPEG-based encoding.

3. The method of claim 1, wherein the content types further include a video type and a text type.

4. The method of claim 3, further comprising, based on a determination that the screen content of a coding unit has a video type, applying an MPEG-based encoding to the screen content of that coding unit.

5. The method of claim 3, further comprising, based on a determination that the screen content of a coding unit has a text type, applying a text codec to the screen content of that coding unit.

6. The method of claim 1, wherein the standards-based encoding comprises at least one of MPEG AVC/H.264 and MPEG HEVC/H.265 encoding.

7. The method of claim 1, wherein classifying screen content includes determining a difference and amount of change between the screen content and screen content at a preceding time.

8. The method of claim 1, wherein classifying screen content includes detecting movement based on a comparison of screen content of the coding unit at a predetermined time to screen content of the coding unit at a preceding time.

9. The method of claim 1, wherein the metadata includes one or more quality flags, a slides flag, a special effects flag, a motion flag, a spatial skip flag, and a temporal skip flag.

10. The method of claim 9, wherein the metadata further includes a plurality of bits defining vertical and horizontal movement of screen content in the coding unit.

11. A system comprising:
a classification component executing on a computing system and configured to classify screen content for each of a plurality of coding units as having a content type selected from among a plurality of content types, at least one of the content types comprising an image type, wherein screen content comprises data describing information displayed on a display; and
one or more encoding modules executing on the computing system, the one or more encoding modules configured to apply an encoding to the screen content of a coding unit based on the content type;
wherein the one or more encoding modules are configured to apply a progressive standards-based encoding to the screen content associated with the coding units having the image type; and
wherein a remote desktop protocol system generates a screen map including metadata associated with each of the plurality of coding units associated with the screen, the metadata defining to a receiving device whether the screen region associated with each coding unit can be decoded by a special-purpose programmable circuit of the receiving device.

12. The system of claim 11, wherein the plurality of coding units correspond to regions of a screen at a predetermined time.

13. The system of claim 11, wherein a remote desktop protocol system generates a screen map including metadata associated with each of the plurality of coding units associated with the screen.

14. The system of claim 13, wherein the metadata includes one or more quality flags, a slides flag, a special effects flag, a motion flag, a spatial skip flag, and a temporal skip flag.

15. The system of claim 11, further comprising a plurality of processors configured to analyze each of the plurality of coding units prior to assessment of the plurality of coding units by the classification component, the plurality of processors including a difference and delta processor, a cache processor, and a motion processor.

16. The system of claim 11, wherein encoded screen content generated by the one or more encoding modules is compatible with a standards-based codec.

17. The system of claim 11, wherein the classification component is included within a remote desktop protocol system of the computing device.

18. The system of claim 17, further comprising a receiving device including a remote desktop client and a standards-based hardware decoder, wherein upon receipt of the screen content, the receiving device decodes encoded screen content associated with the coding units using the standards-based hardware decoder.

19. A computer storage medium having computer-executable instructions stored thereon which, when executed, cause a computing system to perform a method of delivering screen content to a client device, the method comprising:
for each of a plurality of coding units corresponding to screen regions included in a screen at a particular time:
classifying screen content, wherein screen content comprises data describing information displayed on a display, the screen content included in the coding unit as having a content type selected from among a plurality of content types, the plurality of content types including an image type, a video type, and a text type;
based on a determination that the screen content has an image type, applying a progressive standards-based encoding to the screen content of that coding unit;
based on a determination that the screen content has a video type, applying a standards-based encoding to the screen content of that coding unit; and
based on a determination that the screen content has a text type, applying a text codec to the screen content of that coding unit;
based on the classification of the screen content in each coding unit, assigning metadata including information about the classification of the screen content to each coding unit;
generating a screen map including metadata associated with each of the plurality of coding units, the metadata including one or more quality flags, a slides flag, a special effects flag, a motion flag, a spatial skip flag, and a temporal skip flag, the metadata defining to a receiving device whether the screen region associated with each coding unit can be decoded by a special-purpose programmable circuit of the receiving device; and
transmitting encoded screen content for each of the screen regions to the client device.

* * * * *